US011577859B1

(12) United States Patent
Howard et al.

(10) Patent No.: US 11,577,859 B1
(45) Date of Patent: Feb. 14, 2023

(54) FAULT RESILIENT AIRBORNE NETWORK

(71) Applicant: Rockwell Collins, Inc., Cedar Rapids, IA (US)

(72) Inventors: Sean D. Howard, Cedar Rapids, IA (US); Raymond Y. Zheng, Cedar Rapids, IA (US)

(73) Assignee: Rockwell Collins, Inc., Cedar Rapids, IA ( * ) Notice: Subject to any disclaimer, the term of this patent is extended or adjusted under 35 U.S.C. 154(b) by 622 days.

(21) Appl. No.: 16/596,525

(22) Filed: Oct. 8, 2019

(51) Int. Cl.
| | |
|---|---|
| *B64F 5/60* | (2017.01) |
| *G06N 20/00* | (2019.01) |
| *B64F 5/40* | (2017.01) |
| *G01M 17/00* | (2006.01) |
| *G06N 5/04* | (2023.01) |

(52) U.S. Cl.
CPC ............. *B64F 5/60* (2017.01); *B64F 5/40* (2017.01); *G01M 17/00* (2013.01); *G06N 5/04* (2013.01); *G06N 20/00* (2019.01)

(58) Field of Classification Search
CPC .. B64F 5/60; B64F 5/40; G01M 17/00; G06N 5/04; G06N 20/00
See application file for complete search history.

(56) References Cited

U.S. PATENT DOCUMENTS

| | | | | |
|---|---|---|---|---|
| 5,521,394 | A * | 5/1996 | Nakanishi | G01D 5/26 250/559.22 |
| 6,462,825 | B1 * | 10/2002 | Wiebesick | G01C 19/70 356/475 |
| 7,739,207 | B2 | 6/2010 | Biazetti et al. | |
| 8,001,063 | B2 | 8/2011 | Tesauro et al. | |
| 8,032,630 | B2 | 10/2011 | Lewis | |
| 9,774,522 | B2 | 9/2017 | Vasseur et al. | |
| 10,200,884 | B2 | 2/2019 | Tan et al. | |
| 11,150,087 | B2 * | 10/2021 | Shi | G01S 11/12 |
| 2013/0261852 | A1 * | 10/2013 | Recksiek | B64D 45/0005 701/3 |
| 2014/0268177 | A1 * | 9/2014 | Saito | G01B 11/2518 356/601 |
| 2018/0174069 | A1 | 6/2018 | Childress et al. | |
| 2019/0242977 | A1 * | 8/2019 | Kiryuu | G01S 7/4818 |

FOREIGN PATENT DOCUMENTS

| | | |
|---|---|---|
| EP | 3041283 B1 | 5/2019 |
| WO | WO 0038030 A1 * | 2/2000 ........... G08G 5/0021 |

* cited by examiner

*Primary Examiner* — Tung S Lau
(74) *Attorney, Agent, or Firm* — Suiter Swantz pc llo

(57) ABSTRACT

A fault resilient airborne network includes a plurality of aircraft system components installed within an aircraft and at least one agent in communication with the plurality of aircraft system components during in-flight operation of the aircraft. The at least one agent is configured to monitor an aircraft system component for a fault, observe a fault within the aircraft system component, and provide reconfiguration instructions to the aircraft system component in response to the observed fault. The at least one agent is further configured to predict a life expectancy of the aircraft system component using machine learning models while monitoring the aircraft system component for a fault, and provide reconfiguration instructions to the aircraft system component when the life expectancy of the aircraft system component meets a threshold. The reconfiguration instructions are configured to cause an adjustment in at least some of the plurality of aircraft system components.

10 Claims, 8 Drawing Sheets

FAULT RESILIENT AIRBORNE NETWORK

BACKGROUND

Airborne networks are prone to failures or faults. These failures or faults may include, but are not limited to, single event upsets, power transients, and extreme environmental variables (e.g., thermal-based environmental variables, physical shock-based environmental variables, electrical shock-based environmental variables, or the like).

Airborne networks with constrained input/output (I/O) communications may have a reduced capability to troubleshoot. For example, the failures or faults may be difficult to troubleshoot when it happens in an environment different from where the device is analyzed (e.g., a failure or fault occurring during airborne operation, versus a failure or fault occurring while grounded). This reduced capability may increase maintenance downtime, and/or may decrease the likelihood of troubleshooting occurring.

Increasing the capacity to detect, troubleshoot, and/or isolate failures or faults may come with increased costs, while running the risk that the detecting, troubleshooting, and/or isolating the failures or faults may not prevent such from occurring. This may result in increased maintenance downtime and/or scrapped flight plans even after a failure or fault is isolated, as maintenance still needs to occur.

SUMMARY

A fault resilient airborne network is disclosed, in accordance with one or more embodiments of the disclosure. The fault resilient airborne network includes a plurality of aircraft system components installed within an aircraft. The fault resilient airborne network includes at least one agent in communication with the plurality of aircraft system components during in-flight operation of the aircraft. The at least one agent is configured to monitor an aircraft system component of the plurality of aircraft system components for a fault. The at least one agent is configured to observe a fault within the aircraft system component. The at least one agent is configured to provide reconfiguration instructions to the aircraft system component in response to the observed fault of the aircraft system component. The reconfiguration instructions provided in response to the observed fault are configured to cause an adjustment in at least some of the plurality of aircraft system components installed within the aircraft.

In some embodiments, the at least one agent is a subset of a plurality of agents. The plurality of agents are each configured to monitor the aircraft system component for a fault.

In some embodiments, the fault resilient airborne network further includes at least one super agent in communication with the plurality of agents during the in-flight operation of the aircraft. The at least one super agent is configured to receive data from the plurality of agents, where the data is collected by the plurality of agents while monitoring the aircraft system component. The at least one super agent is configured to arbitrate whether a fault was observed within the aircraft system component based on the data.

In some embodiments, the aircraft system component is configured to receive data from a second aircraft system component of the plurality of aircraft system components.

In some embodiments, the at least one agent is further configured to provide reconfiguration instructions to a third aircraft system component of the plurality of aircraft system components. The third aircraft system component is redundant to the aircraft system component with the observed fault. The reconfiguration instructions provided to the third aircraft system component are to receive data from the second aircraft system component in place of the aircraft system component with the observed fault.

In some embodiments, the at least one agent is further configured to provide reconfiguration instructions to the second aircraft system component. The reconfiguration instructions provided to the second aircraft system component are to transmit data to the third aircraft system component instead of to the aircraft system component with the observed fault.

In some embodiments, the fault is observed within a sub-module of the aircraft system component.

In some embodiments, the at least one agent is further configured to provide reconfiguration instructions to a second sub-module of the aircraft system component with the observed fault in the sub-module. The reconfiguration instructions provided to the second sub-module are to receive data from the second aircraft system component in place of the sub-module with the observed fault.

In some embodiments, the at least one agent is further configured to provide reconfiguration instructions to the second aircraft system component. The reconfiguration instructions provided to the second aircraft system component are to transmit data to the second sub-module of the aircraft system component with the observed fault in the sub-module instead of to the sub-module with the observed fault.

In some embodiments, the at least one agent is further configured to predict a life expectancy of the aircraft system component using machine learning models while monitoring the aircraft system component for a fault. The machine learning models are configured to predict the life expectancy of the aircraft system component based on a set of rules generated from a plurality of faults previously-observed within the plurality of aircraft system components. The at least one agent is further configured to provide reconfiguration instructions to the aircraft system component when the life expectancy of the aircraft system component meets a threshold. The threshold is defined by a percentage chance the aircraft system component will develop a fault. The reconfiguration instructions provided in response to the meeting of the threshold are configured to cause an adjustment in at least some of the plurality of aircraft system components installed within the aircraft.

In some embodiments, the at least one agent is further configured to repair the observed fault within the aircraft system component.

A fault resilient airborne network is disclosed, in accordance with one or more embodiments of the disclosure. The fault resilient airborne network includes a plurality of aircraft system components installed within an aircraft. The fault resilient airborne network includes at least one agent in communication with the plurality of aircraft system components during in-flight operation of the aircraft. The at least one agent is configured to monitor an aircraft system component of the plurality of aircraft system components for a fault. The at least one agent is further configured to predict a life expectancy of the aircraft system component using machine learning models while monitoring the aircraft system component for a fault. The machine learning models are configured to predict the life expectancy of the aircraft system component based on a set of rules generated from a plurality of faults previously-observed within the plurality of aircraft system components. The at least one agent is further configured to provide reconfiguration instructions to the aircraft system component when the life expectancy of the aircraft system component meets a threshold. The threshold is defined by a percentage chance the aircraft system component will develop a fault. The reconfiguration instructions provided in response to the meeting of the threshold are configured to cause an adjustment in at least some of the plurality of aircraft system components installed within the aircraft.

In some embodiments, the at least one agent is further configured to observe a fault within the aircraft system component. The at least one agent is further configured to provide reconfiguration instructions to the aircraft system component in response to the observed fault of the aircraft system component. The reconfiguration instructions provided in response to the observed fault are configured to cause an adjustment in at least some of the plurality of aircraft system components installed within the aircraft.

In some embodiments, the at least one agent is a subset of a plurality of agents. The plurality of agents are each configured to monitor the aircraft system component for a fault.

In some embodiments, the fault resilient airborne network further includes at least one super agent in communication with the plurality of agents during the in-flight operation of the aircraft. The at least one super agent is configured to receive data from the plurality of agents. The data is collected by the plurality of agents while monitoring the aircraft system component. The at least one super agent is further configured to arbitrate data whether the life expectancy of the aircraft system component meets the threshold based on the data.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
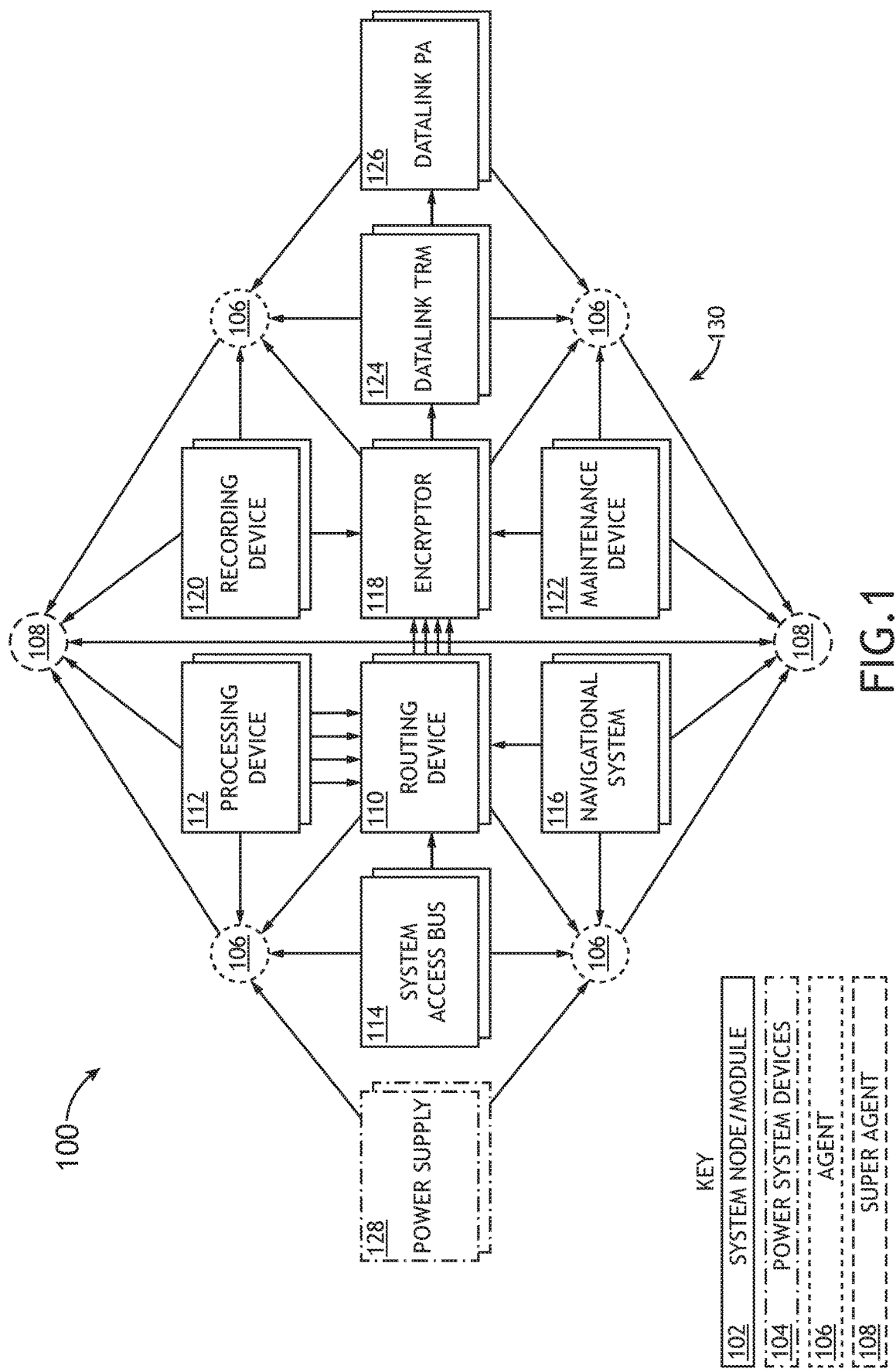
FIG. 1 is a block diagram illustrating a fault resilient airborne network, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-8B generally illustrate a fault resilient airborne network 100, in accordance with one or more embodiments of the disclosure. It is noted herein that the term "fault resilient airborne network 100" and variants of the term "fault resilient airborne network 100" (e.g., "airborne network 100," "network 100," or the like) may be considered equivalent for purposes of the disclosure.

Airborne networks (or network environments) with constrained input/output (I/O) communications may benefit from improving failure or fault detection, troubleshooting, and/or isolation to add an element of resiliency and/or prediction capability to the airborne networks. The resiliency and/or prediction capability may be integral to the safe operation of the airborne networks to ensure the airborne networks survive failures or faults.

For example, it may be beneficial to provide resiliency and/or prediction capability where memory of a single node in an airborne network is failing. Even if the memory is reported as failing, the failure itself is not halted. Unless the failing memory is successfully detected and isolated, the failure may result in a scrapped flight, resulting in lost time and/or money.

By way of another example, it may be beneficial to provide resiliency and/or prediction capability where a thruster in a space station network is failing an I/O communication test. Even if the thruster is reported as failing the I/O communication test, the failure itself is not halted. Unless the thruster failing the I/O communication test is successfully detected and isolated, the failure may result in a failed mission, resulting in lost time and/or money and a possible safety issue.

In this regard, a series of agent modules or devices and/or a series of super agent modules or devices may be provided to monitor network functions and/or assets.

The agents and/or the super agents may be capable of reconfiguring the network (and the modules within the network) to self-heal the network following an observed failure or fault. For example, the agents and/or the super agents may rotate in redundant modules, sub-modules, and/or assets.

The agents and/or the super agents may be capable of reporting predicted failures to an end user, where an end user has manual override capability.

The agents and/or the super agents may be capable of providing predicted maintenance actions based on information gathered with machine learning models or algorithms and/or based on a maintenance log.

The agents and/or the super agents may be capable of machine learning models or algorithms to learn from failure data within system and/or failure databases to actively predict failures within the system and rotate module, sub-modules, and/or assets out before failure occurs.

FIG. 1 illustrates a fault resilient airborne network 100, in accordance with one or more embodiments of the disclosure.

The fault resilient airborne network 100 may include one or more aircraft system nodes or modules 102 (e.g., nodes, modules, functions, devices, or the like). The fault resilient airborne network 100 may include one or more aircraft power system devices 104.

Figure 7:
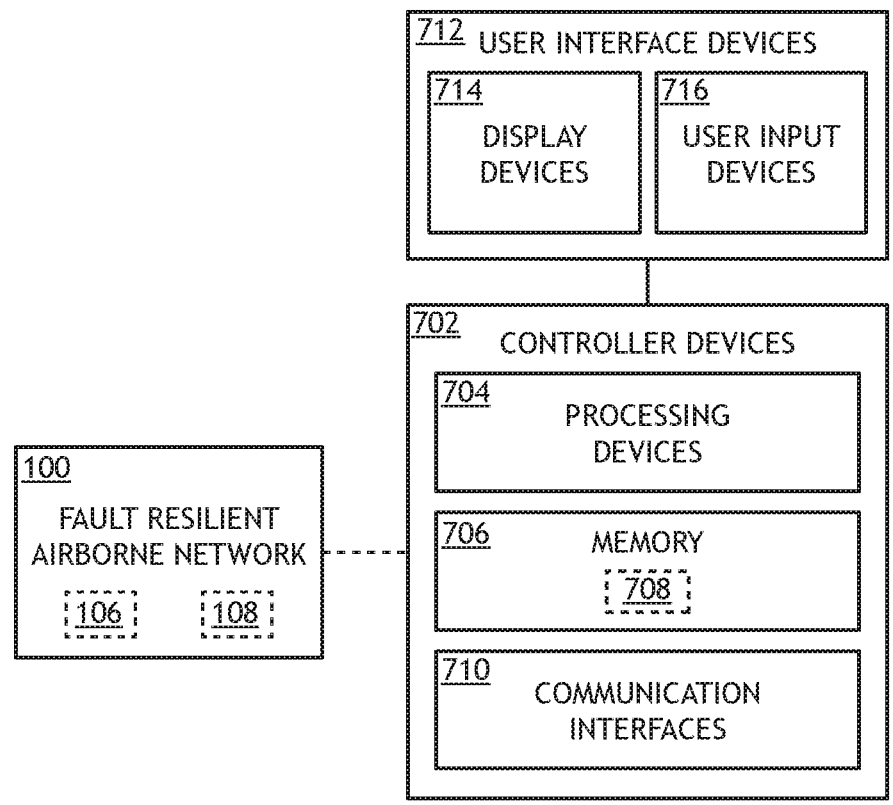
FIG. 7 is a block diagram illustrating a system including a fault resilient airborne network, in accordance with one or more embodiments of the disclosure.

The fault resilient airborne network 100 may include one or more agents 106. For example, the one or more agents 106 may be in communication with one or more aircraft system components of an aircraft (e.g., an aircraft 700, as illustrated in FIG. 7). For instance, the one or more agents 106 may be in communication during in-flight operation of the aircraft. The one or more agents 106 may be capable of monitoring and/or configuring the aircraft system nodes or modules 102 and/or the aircraft power system devices 104. For example, an agent 106 may be capable of monitoring and/or configuring four aircraft system nodes or modules 102 and aircraft power systems devices 104. The one or more agents 106 may include one or more redundant agents. For example, select redundant agents 106 may be capable of monitoring and/or configuring the same select aircraft system nodes or modules 102 and/or the same select aircraft power system devices 104. In this regard, the select redundant agents 106 may be swappable in case of failure.

Each agent 106 may include agent-specific logic. It is noted herein, however, that a set of the one or more agents 106 may include the same logic (e.g., where the set of agents 106 are fully swappable and redundant).

The fault resilient airborne network 100 may include one or more super agents 108. For example, the one or more super agents 108 may be in communication with the one or more agents 106. For instance, the one or more super agents 108 may be in communication during the in-flight operation of the aircraft. The one or more super agents 108 may be capable of communication between the one or more agents 106. The one or more super agents 108 may be capable of arbitration in decision logic (e.g., can operate as a voting system about whether there is a failure/what the failure is). For example, the arbitration may be between data from the one or more agents 106; between data from the one or more aircraft system nodes or modules 102; between data from the one or more aircraft power system devices 104; between some combination of data from the one or more aircraft system nodes or modules 102, the one or more aircraft power system devices 104, and the one or more agents 106; or the like. The fault resilient airborne network 100 may include one or more redundant super agents 108. For example, select redundant super agents 108 may be capable of communication with the same select agents 106. In this regard, the select redundant super agents 108 may be swappable in case of failure.

Each super agent 108 may include super agent-specific logic. It is noted herein, however, that a set of the one or more super agents 108 may include the same logic (e.g., where the set of super agents 108 are fully swappable and redundant).

The one or more aircraft system nodes or modules 102 may include one or more routing devices 110. For example, a routing device 110 may be communicatively coupled to an agent 106 and/or a super agent 108. For instance, the processing device 112 may be configured to transmit data to the agent 106 and/or the super agent 108. It is noted herein that "routing device" and "communication interface" may be considered equivalent, for purposes of the disclosure.

The one or more aircraft system nodes or modules 102 may include one or more processing devices 112. For example, a processing device 112 may be communicatively coupled to an agent 106 and/or a super agent 108. For instance, the processing device 112 may be configured to transmit data to the agent 106 and/or the super agent 108. By way of another example, a processing device 112 may be communicatively coupled to a routing device 110. For instance, the processing device 112 may be configured to transmit data to the routing device 110.

The one or more aircraft system nodes or modules 102 may include one or more system access buses 114. For example, a system access bus 114 may be communicatively coupled to an agent 106 and/or a super agent 108. For instance, the system access bus 114 may be configured to transmit data to the agent 106 and/or the super agent 108. By way of another example, a system access bus 114 may be communicatively coupled to a routing device 110. For instance, the system access bus 114 may be configured to transmit data to the routing device 110.

The one or more aircraft system nodes or modules 102 may include one or more navigational systems 116. For example, a navigational system 116 may be communicatively coupled to an agent 106 and/or a super agent 108. For instance, the navigational system 116 may be configured to transmit data to the agent 106 and/or the super agent 108. By way of another example, a navigational system 116 may be communicatively coupled to a routing device 110. For instance, the navigational system 116 may be configured to transmit data to the routing device 110. The one or more navigation systems 116 may include, but are not limited to, one or more antennae, one or more GPS receivers, one or more differential GPS receivers, one or more Global Navigation Satellite Systems (GNSS) receivers, one or more ADS-B receivers, one or more precision navigation systems, one or more radios for performing angle of arrival (AOA) or time difference of arrival (TDOA) determinations, or the like.

The one or more aircraft system nodes or modules 102 may include one or more encryptors 118. For example, an encryptor 118 may be communicatively coupled to a routing device 110. For instance, the encryptor 118 may be configured to receive data from the routing device 110. By way of another example, an encryptor 118 may be communicatively coupled to an agent 106 and/or a super agent 108. For instance, the encryptor 118 may be configured to transmit data to the agent 106 and/or the super agent 108.

The one or more aircraft system nodes or modules 102 may include one or more recording devices 120. For example, a recording device 120 may be communicatively coupled to an encryptor 118. For instance, the recording device 120 may be configured to transmit data to the encryptor 118. By way of another example, a recording device 120 may be communicatively coupled to an agent 106 and/or a super agent 108. For instance, the recording device 120 may be configured to transmit data to the agent 106 and/or the super agent 108. It is noted herein that "recording device" and "memory" may be considered equivalent, for purposes of the disclosure.

The one or more aircraft system nodes or modules 102 may include one or more maintenance devices 122. For example, a maintenance device 122 may be communicatively coupled to an encryptor 118. For instance, the maintenance device 122 may be configured to transmit data to the encryptor 118. By way of another example, a maintenance device 122 may be communicatively coupled to an agent 106 and/or a super agent 108. For instance, the maintenance device 122 may be configured to transmit data to the agent 106 and/or the super agent 108.

The one or more aircraft system nodes or modules 102 may include one or more datalink transmit/receive modules 124 (datalink TRM 124). For example, a datalink TRM 124 may be communicatively coupled to an encryptor 118. For instance, the datalink TRM 124 may be configured to receive data from the encryptor 118. By way of another example, a datalink TRM 124 may be communicatively coupled to an agent 106 and/or a super agent 108. For instance, the datalink TRM 124 may be configured to transmit data to the agent 106 and/or the super agent 108.

The one or more aircraft system nodes or modules 102 may include one or more datalink power amplifier 126 (PA 126). For example, a datalink PA 126 may be communicatively coupled to a datalink TRM 124. For instance, the datalink PA 126 may be configured to receive data from the datalink TRM 124. By way of another example, a datalink PA 126 may be communicatively coupled to an agent 106 and/or a super agent 108. For instance, the datalink PA 126 may be configured to transmit data to the agent 106 and/or the super agent 108.

In this regard, the one or more aircraft system nodes or modules 102 may include, but are not limited to, the routing devices 110, the processing devices 112, the system access buses 114, the navigational systems 116, the encryptors 118, the recording devices 120, the maintenance devices 122, the datalink TRM 124, and/or the datalink PA 126.

The one or more aircraft power system devices 104 may include one or more power supplies 128. For example, a power supply 128 may be communicatively coupled to an agent 106 and/or a super agent 108. For instance, the power supply 128 may be configured to transmit power and/or data to the agent 106 and/or the super agent 108. The one or more power supplies 128 may include, but are not limited to, one or more power supplies integrated within an aircraft (e.g., the aircraft 700, as illustrated in FIG. 7), one or more power supplies onboard an aircraft and standalone from a power supply integrated within the aircraft, or the like. For example, an agent 106 and/or a super agent 108 may be powered by an independent power supply 128. By way of another example, an agent 106 and/or a super agent 108 may be powered by a set of power supplies 128. In this regard, a complete, continuous monitoring of components (e.g., modules or sub-modules) within or coupled to the fault resilient airborne network 100 by the agent 106 and/or the super agent 108 may be possible.

Although one or more embodiments of the disclosure illustrate the one or more power supplies 128 as being an aircraft power system device 104, it is noted herein the one or more power supplies 128 may instead be considered an aircraft system node or module 102. Therefore, the above description should not be interpreted as a limitation on the scope of the disclosure but merely an illustration.

The one or more aircraft system nodes or modules 102, the one or more aircraft power system devices 104, the one or more agents 106, and/or the one or more super agents 108 may be considered one or more aircraft system components 130, for purposes of the disclosure. For example, the one or more aircraft system components 130 may include one or more electrical components (e.g., controllers, sensors, lights, communication devices, navigation devices, or the like), one or more steering components (e.g., wing flaps, tail flaps, or the like), one or more propulsion components (e.g., engines, fuel lines, or the like), one or more landing components (e.g., wheels, or the like), or any other component of an aircraft (e.g., the aircraft 700, as illustrated in FIG. 7).

It is noted herein that the fault resilient airborne network 100 as illustrated in FIG. 1 is just one example of the fault resilient airborne network 100, and that the fault resilient airborne network 100 is not limited to the arrangement and/or configuration as illustrated in FIG. 1. For example, the various one or more aircraft system nodes or modules 102 may be communicatively coupled to one another in a manner other than as described in the example above. In general, the fault resilient airborne network 100 may be configured and/or arranged in any way that is not limited by physical space (e.g., where physical space is not a major design constraint). Therefore, the above description should not be interpreted as a limitation on the scope of the disclosure but merely an illustration.

Although the fault resilient airborne network 100 is illustrated as including one or more standalone processing devices 112, it is noted herein that the one or more aircraft system components 130 of the fault resilient airborne network 100 may include one or more built-in or integrated processing devices 112 (e.g., as one or more sub-module processing devices 112). In addition, although the fault resilient airborne network 100 is illustrated as including memory (e.g., one or more standalone recording devices 120), it is noted herein that the one or more aircraft system components 130 of the fault resilient airborne network 100 may include built-in or integrated memory (e.g., as one or more sub-module memory components). Further, although the fault resilient airborne network 100 is illustrated as including one or more communication interfaces (e.g., routing devices 110), it is noted herein that the one or more aircraft system components 130 of the fault resilient airborne network 100 may include one or more built-in or integrated communication interfaces (e.g., as one or more sub-module communication interface components). Therefore, the above description should not be interpreted as a limitation on the scope of the disclosure but merely an illustration.

It is noted herein that adjustments to the fault resilient airborne network 100 may occur during in-flight operation of an aircraft (e.g., the aircraft 700, as illustrated in FIG. 7). For example, components (e.g., modules or sub-modules) of or components coupled to the fault resilient airborne network 100 may be rotated out and/or retired when it is determined by the one or more agents 106 and/or the one or more super agents 108 that the components are malfunctioning. By way of another example, repairs (e.g., system maintenance) may be performed on the rotated out and/or retired components. Where possible, the rotated out and/or retired components may be returned to operation. For instance, the rotated out and/or retired components may be returned to operation immediately following system maintenance being completed. In addition, the rotated out and/or retired components may be returned to operation following a failure of another component in the fault resilient airborne network 100. In this regard, the fault resilient airborne network 100 may not be subject to the same downtime/cost due to faults or failures than that realized by a traditional airborne network.

Figure 2:
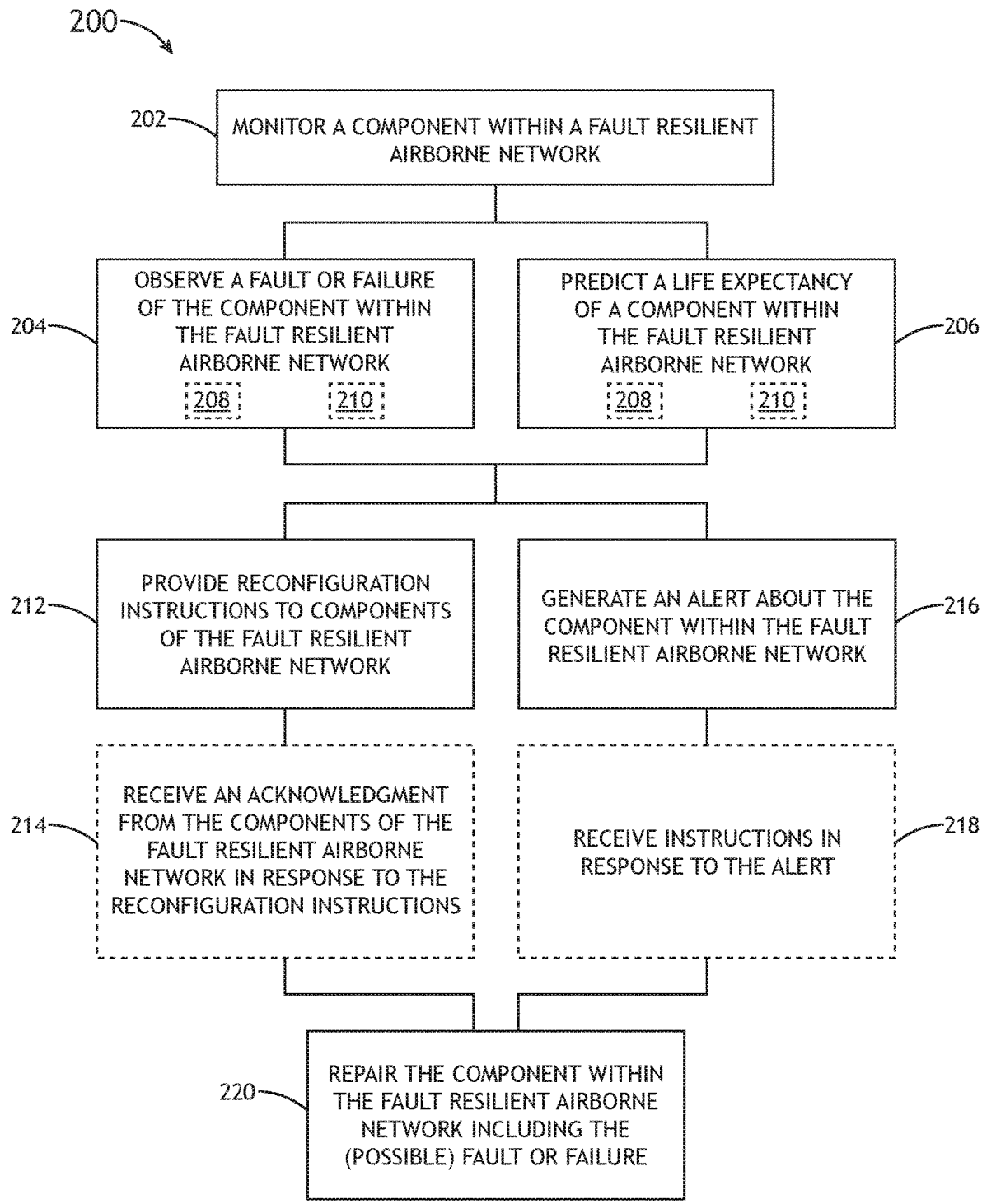
FIG. 2 is a flow diagram illustrating a method for operating a fault resilient airborne network, in accordance with one or more embodiments of the disclosure.

FIG. 2 illustrates a method 200 of the fault resilient airborne network 100 in operation, in accordance with one or more embodiments of the disclosure. It is noted herein the method 200 includes one or more actions the one or more agents 106 and/or the one or more super agents 108 may perform on the one or more aircraft system components 130 installed within a aircraft (e.g., the aircraft 700, as illustrated in FIG. 7) during in-flight operation of the aircraft and/or during ground testing and maintenance of the aircraft.

In a step 202, a component (e.g., module or sub-module) within the fault resilient airborne network is monitored. For example, the component may include, but is not limited to, an aircraft system node or module 102, an aircraft power system device 104, an agent 106, a super agent 108, or the like. The component may be monitored for faulty or failing operations by one or more agents 106.

In a step 204, a fault or failure of the component within the fault resilient airborne network is observed. The one or more agents 106 may run tests (e.g., including commanded built-in-tests (CBIT), communication pinging with data packets, or the like) to determine whether the component is faulty or failing.

In a step 206, a life expectancy of a component within the fault resilient airborne network may be predicted. The life expectancy of the component may be determined via machine learning models or algorithms (e.g., as described in FIGS. 8A and 8B, below) based on the possibility of developing a fault or failure.

In an optional step 208 of either step 204 or step 206, where multiple agents 106 monitor the component, one or more super agents 108 communicatively coupled to the multiple agents 106 may be configured to arbitrate based on data received from the multiple agents 106. For example, the one or more super agents 108 may arbitrate whether the component is faulty or failing based on information provided by the multiple agents 106. By way of another example, the one or more super agents 108 may arbitrate whether the life expectancy of the component meets a threshold, where the threshold is defined by a percentage chance a fault will develop (e.g., as described in FIGS. 8A and 8B).

In an optional step 210 of either step 204 or step 206, where multiple agents 106 monitor the component, the multiple agents 106 may themselves be configured to determine the state of the component based on shared information. For example, the multiple agents 106 may determine whether the component is faulty or failing based on shared information. By way of another example, the multiple agents 106 may determine whether the life expectancy of the component meets a threshold, where the threshold is defined by a percentage chance a fault will develop (e.g., as described in FIGS. 8A and 8B).

In a step 212, one or more reconfiguration instructions may be provided to one or more components (e.g., modules or sub-modules) of the fault resilient airborne network. The reconfiguration instructions may be provided when the fault or failure is observed and/or when the life expectancy meets a threshold. The reconfiguration instructions may be provided to one or more components of the fault resilient airborne network 100 to cause an adjustment or change of the provided-to one or more components within the fault resilient airborne network 100. For example, the reconfiguration instructions may be provided to the faulty or failing component, where the reconfiguration instructions may be configured to cause the fault resilient airborne network 100 to remove the faulty or failing component from active service. By way of another example, the reconfiguration instructions may be provided to one or more components that operate in a redundant capacity to the fault or failing component, where the reconfiguration instructions may be configured to cause the fault resilient airborne network 100 to instate or otherwise activate the redundant-capacity components into active service. By way of another example, the reconfiguration instructions may be provided to one or more networked components configured to transmit and/or receive data from the faulty or failing component, where the reconfiguration instructions may be configured to cause the fault resilient airborne network 100 to cause the networked components to stop transmitting to the removed faulty or failing component and start transmitting to the activated redundant-capacity components.

In an optional step 214, one or more acknowledgements may be received from the one or more components of the fault resilient airborne network in response to the one or more reconfiguration instructions.

In a step 216, an alert about the component within the fault resilient airborne networking may be generated. The alert may indicate the component has developed a fault or failure. The alert may indicate the component is predicted to develop a fault or failure. The alert may be provided to an end user (e.g., pilot, crew member, maintenance technician, operator, or the like). The end user may have manual override capabilities to remove the faulty or failed component from use within the fault resilient airborne network 100. The end user may have capabilities to schedule and/or complete maintenance action before the predicted fault or failure of the component occurs (e.g., without interfering with flight activities).

In an optional step 218, instructions provided in response to the alert may be received. The instructions may be provided by an end user (e.g., pilot, crew member, maintenance technician, operator, or the like).

In a step 220, the component including the fault or failure may be repaired. For example, where the fault or failure is software-based, the component may be reprogrammed to a last known good image (e.g., the component to a restore point). The repaired component may be re-used immediately or re-used following another similar (and possibly redundant) component developing a fault or failure. It is noted herein, however, that the repair may occur whether or not acknowledgments are received in response to configuration instructions (e.g., in optional step 214) and/or instructions are received in response to an alert (e.g., in optional step 218). Therefore, the above description should not be interpreted as a limitation on the scope of the disclosure but merely an illustration.

The method 200 is not limited to the steps and/or sub-steps provided. The method 200 may include more or fewer steps and/or sub-steps. The method 200 may perform the steps and/or sub-steps in an order other than provided. Therefore, the above description should not be interpreted as a limitation on the scope of the disclosure but merely an illustration.

FIGS. 3-6 illustrate example uses of the method 200 of the fault resilient airborne network 100, in accordance with one or more embodiments of the disclosure.

Figure 3:
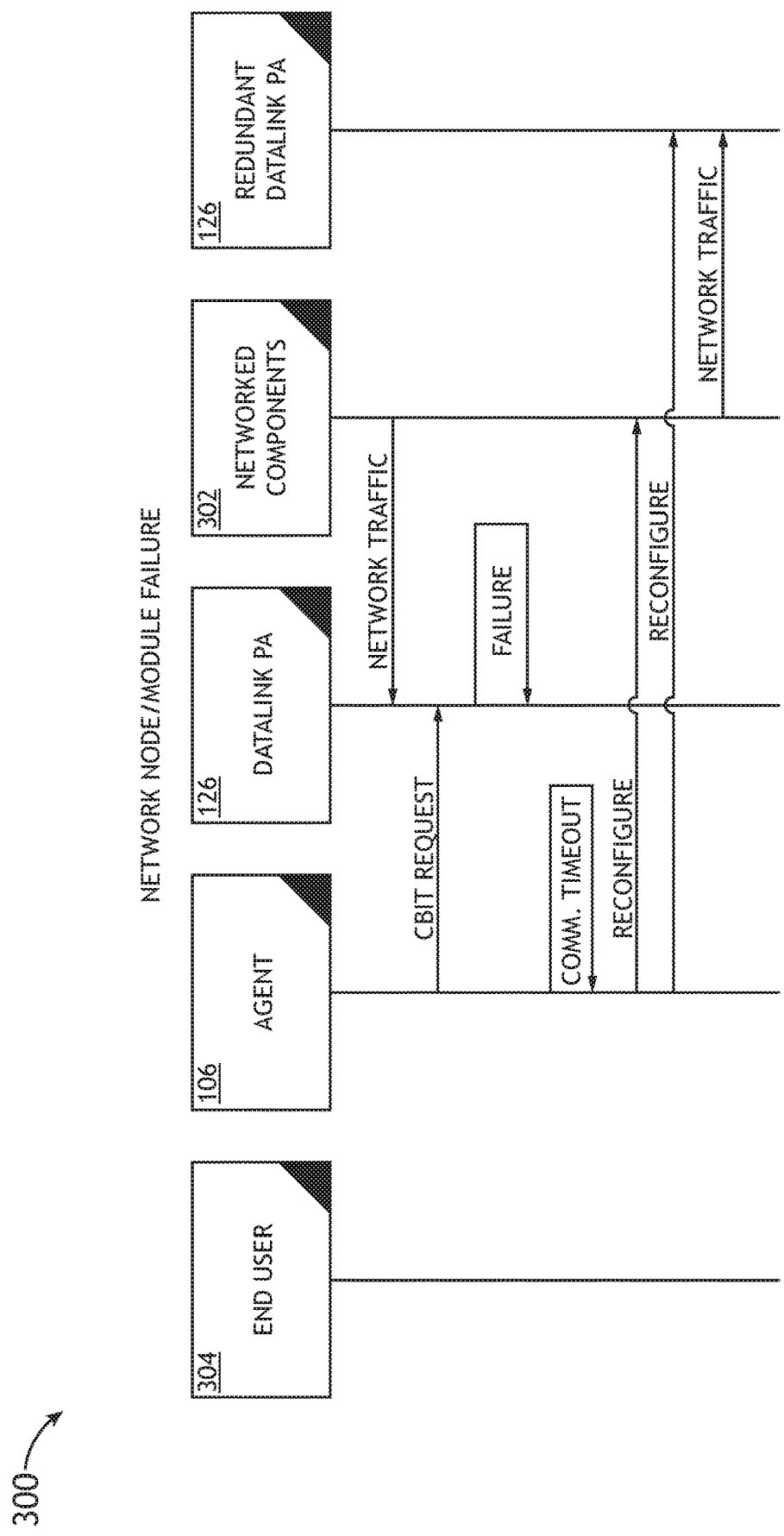
FIG. 3 is a flow diagram illustrating an example use of a method for operating a fault resilient airborne network, in accordance with one or more embodiments of the disclosure.

Referring now to FIG. 3, a flow diagram 300 of the fault resilient airborne network 100 addressing a failing network node or module is illustrated.

In the flow diagram 300, a faulty or failing network node or module is observed within the fault resilient airborne network 100. For example, the faulty or failing network node or module may include a datalink PA 126.

The datalink PA 126 may receive data (e.g., network traffic) from one or more networked components 302 (e.g., a datalink TRM 124, as illustrated in the example configuration of the fault resilient airborne network 100 in FIG. 1).

An agent 106 may monitor the datalink PA 126. Based on a response (or lack of response) from the datalink PA 126, the agent 106 may determine the datalink PA 126 is faulty or failing. For example, the agent 106 may transmit a commanded built-in-test (CBIT) request to the datalink PA 126, and the datalink PA 126 may generate a failure in response to the CBIT request. By way of another example, the agent 106 may transmit data to the datalink PA 126, and the datalink PA 126 may respond with intermittent communication and/or be non-responsive (e.g., there being a lack of communication).

Upon determining the datalink PA 126 is faulty or failing, the agent 106 may transmit reconfiguration instructions to the one or more networked components 302 attempting to transmit data (e.g., network traffic) to the datalink PA 126. In addition, upon determining the datalink PA 126 is faulty or failing the agent 106 may transmit reconfiguration instructions to a redundant datalink PA 126. Based on the reconfiguration instructions, the one or more networked components 302 may be configured to transmit data (e.g., network traffic) to the redundant datalink PA 126, and the redundant datalink PA 126 may be configured to receive the transmitted data (e.g., network traffic) from the one or more networked components 302.

The agent 106 may then attempt to configure (e.g., attempt to repair) the faulty or failing datalink PA 126, such that the repaired datalink PA 126 may be re-used immediately or re-used following another datalink PA 126 developing a fault or failure. In addition or in the alternative, the agent 106 may transmit an alert to an end user (e.g., pilot, crew member, maintenance technician, operator, or the like) about the faulty or failing datalink PA 126, where the end user may have manual override capabilities to cause an adjustment or change within the fault resilient airborne network 100 (e.g., via provided instructions).

It is noted herein that multiple agents 106 may be configured to monitor the datalink PA 126. Here, a determination of whether the datalink PA 126 is faulty or failing may be decided between the multiple agents 106, and/or may be decided by a super agent 108 communicatively coupled to the multiple agents 106 and configured to arbitrate whether the datalink PA 126 is faulty or failing based on information provided by the multiple agents 106.

Although the example method of the flow diagram 300 is illustrated as addressing a faulty or failing datalink PA 126, it is noted herein the method may be extended to any component (e.g., module or sub-module) of the fault resilient airborne network 100. Therefore, the above description should not be interpreted as a limitation on the scope of the disclosure but merely an illustration.

Figure 4:
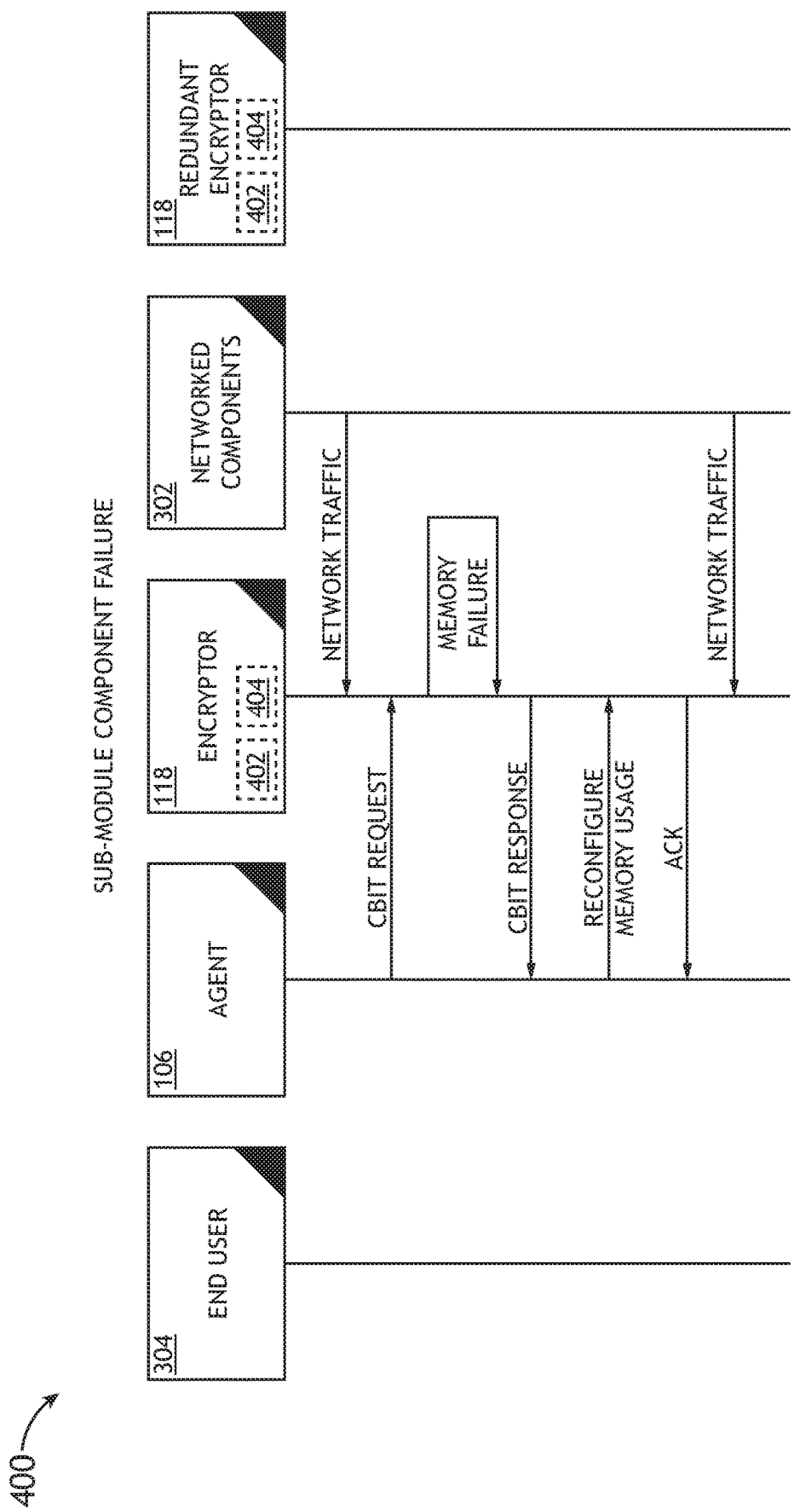
FIG. 4 is a flow diagram illustrating an example use of a method for operating a fault resilient airborne network, in accordance with one or more embodiments of the disclosure.

Referring now to FIG. 4, a flow diagram 400 of the fault resilient airborne network 100 addressing a failing network node or module is illustrated.

In the flow diagram 400, a faulty or failing sub-module of a network node or module is observed within the fault resilient airborne network 100. For example, the faulty or failing sub-module may include a memory sub-module 402 of an encryptor 118.

The memory sub-module 402 of the encryptor 118 may receive data (e.g., network traffic) from one or more networked components 302 (e.g., a routing device 110, a recording device 120, and/or a maintenance device 122, as illustrated in the example configuration of the fault resilient airborne network 100 in FIG. 1).

An agent 106 may monitor the memory sub-module 402 of the encryptor 118. Based on a response (or lack of response) from the memory sub-module 402 of the encryptor 118, the agent 106 may determine the memory sub-module 402 of the encryptor 118 is faulty or failing. For example, the agent 106 may transmit a commanded built-in-test (CBIT) request to the memory sub-module 402 of the encryptor 118, and the memory sub-module 402 of the encryptor 118 may generate a failure in response to the CBIT request.

Upon determining the memory sub-module 402 of the encryptor 118 is faulty or failing, the agent 106 may transmit reconfiguration instructions to the encryptor 118. Based on the reconfiguration instructions, the encryptor 118 may be configured to use a redundant memory sub-module 404 in place of the faulty or failing memory sub-module 402, and the redundant memory sub-module 404 may be configured to receive the transmitted data (e.g., network traffic) from the one or more networked components 302.

In the alternative, upon determining the datalink PA 126 is faulty or failing the agent 106 may transmit reconfiguration instructions to the one or more network components 302 and a redundant encryptor 118 including memory submodules 402, 404. Based on the reconfiguration instructions, the one or more networked components 302 may be configured to transmit data (e.g., network traffic) to the redundant encryptor 118 and a memory sub-module 402, 404 of the redundant encryptor 118 may be configured to receive the transmitted data (e.g., network traffic) from one or more networked components 302.

The agent 106 may then attempt to reconfigure (e.g., attempt to repair) the faulty or failing memory sub-module 402 of the encryptor 118, such that the repaired memory sub-module 402 of the encryptor 118 may be re-used immediately or re-used following another memory sub-module of the encryptor 118 developing a fault or failure. In addition or in the alternative, the agent 106 may transmit an alert to an end user (e.g., pilot, crew member, maintenance technician, operator, or the like) about the faulty or failing memory sub-module 402 of the encryptor 118, where the end user may have manual override capabilities to cause an adjustment or change within the fault resilient airborne network 100 (e.g., via provided instructions).

It is noted herein that multiple agents 106 may be configured to monitor the memory sub-module 402 of the encryptor 118. Here, a determination of whether the memory sub-module 402 of the encryptor 118 is faulty or failing may be decided between the multiple agents 106, and/or may be decided by a super agent 108 communicatively coupled to the multiple agents 106 and configured to arbitrate whether the memory sub-module 402 of the encryptor 118 is faulty or failing based on information provided by the multiple agents 106.

Although the example method of the flow diagram 400 is illustrated as addressing a faulty or failing memory sub-module 402 of the encryptor 118, it is noted herein the method may be extended to any component (e.g., module or sub-module) of the fault resilient airborne network 100. Therefore, the above description should not be interpreted as a limitation on the scope of the disclosure but merely an illustration.

Figure 5:
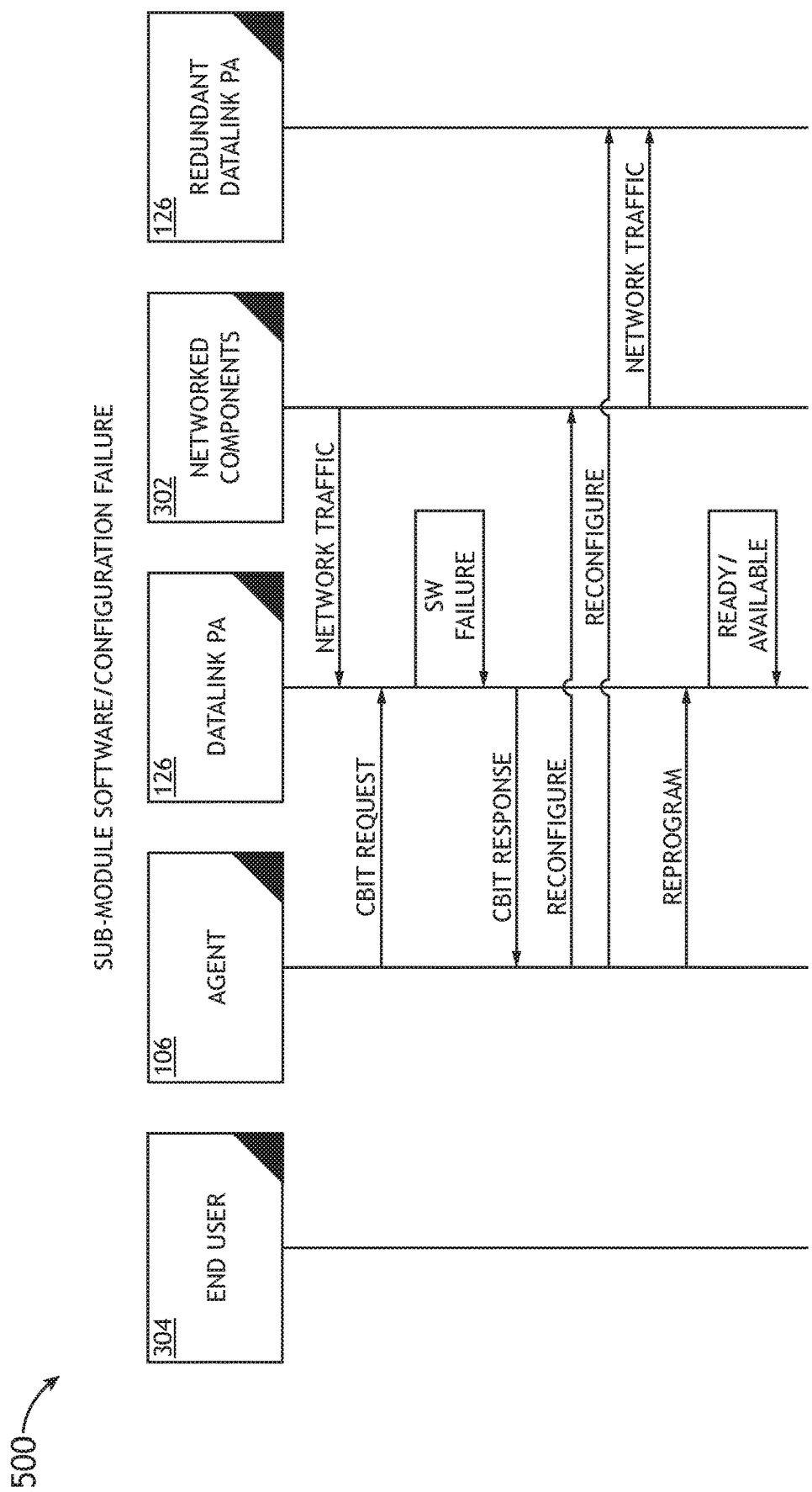
FIG. 5 is a flow diagram illustrating an example use of a method for operating a fault resilient airborne network, in accordance with one or more embodiments of the disclosure.

Referring now to FIG. 5, a flow diagram 500 of the fault resilient airborne network 100 addressing a failing network node or module is illustrated.

In the flow diagram 500, a faulty or failing network node or module is observed within the fault resilient airborne network 100. For example, the faulty or failing network node or module may include a datalink PA 126.

The datalink PA 126 may receive data (e.g., network traffic) from one or more networked components 302 (e.g., a datalink TRM 124, as illustrated in the example configuration of the fault resilient airborne network 100 in FIG. 1).

An agent 106 may monitor the datalink PA 126. Based on a response from the datalink PA 126, the agent 106 may determine the datalink PA 126 is faulty or failing. For example, the agent 106 may transmit a commanded built-in-test (CBIT) request to the datalink PA 126, and the datalink PA 126 may generate a software failure in response to the CBIT request (e.g., as opposed to a firmware or physical failure of the datalink PA 126).

Upon determining the datalink PA 126 is faulty or failing, the agent 106 may transmit reconfiguration instructions to the one or more networked components 302 attempting to transmit data (e.g., network traffic) to the datalink PA 126. In addition, upon determining the datalink PA 126 is faulty or failing the agent 106 may transmit reconfiguration instructions to a redundant datalink PA 126. Based on the reconfiguration instructions, the one or more networked components 302 may be configured to transmit data (e.g., network traffic) to the redundant datalink PA 126, and the redundant datalink PA 126 may be configured to receive the transmitted data (e.g., network traffic) from the one or more networked components 302.

The agent 106 may then attempt to configure (e.g., attempt to repair) the faulty or failing datalink PA 126, such that the repaired datalink PA 126 may be re-used immediately or re-used following another datalink PA 126 developing a fault or failure. For example, the agent 106 may reprogram the faulty or failing datalink PA 126 to reset the faulty or failing datalink PA 126 to a last known good image (e.g., reset the faulty or failing datalink PA 126 to a restore point). In addition or in the alternative, the agent 106 may transmit an alert to an end user (e.g., pilot, crew member, maintenance technician, operator, or the like) about the faulty or failing datalink PA 126, where the end user may have manual override capabilities to cause an adjustment or change within the fault resilient airborne network 100 (e.g., via provided instructions).

It is noted herein that multiple agents 106 may be configured to monitor the datalink PA 126. Here, a determination of whether the datalink PA 126 is faulty or failing may be decided between the multiple agents 106, and/or may be decided by a super agent 108 communicatively coupled to the multiple agents 106 and configured to arbitrate whether the datalink PA 126 is faulty or failing based on information provided by the multiple agents 106.

Although the example method of the flow diagram 500 is illustrated as addressing a faulty or failing datalink PA 126, it is noted herein the method may be extended to any component (e.g., module or sub-module) of the fault resilient airborne network 100. Therefore, the above description should not be interpreted as a limitation on the scope of the disclosure but merely an illustration.

Figure 6:
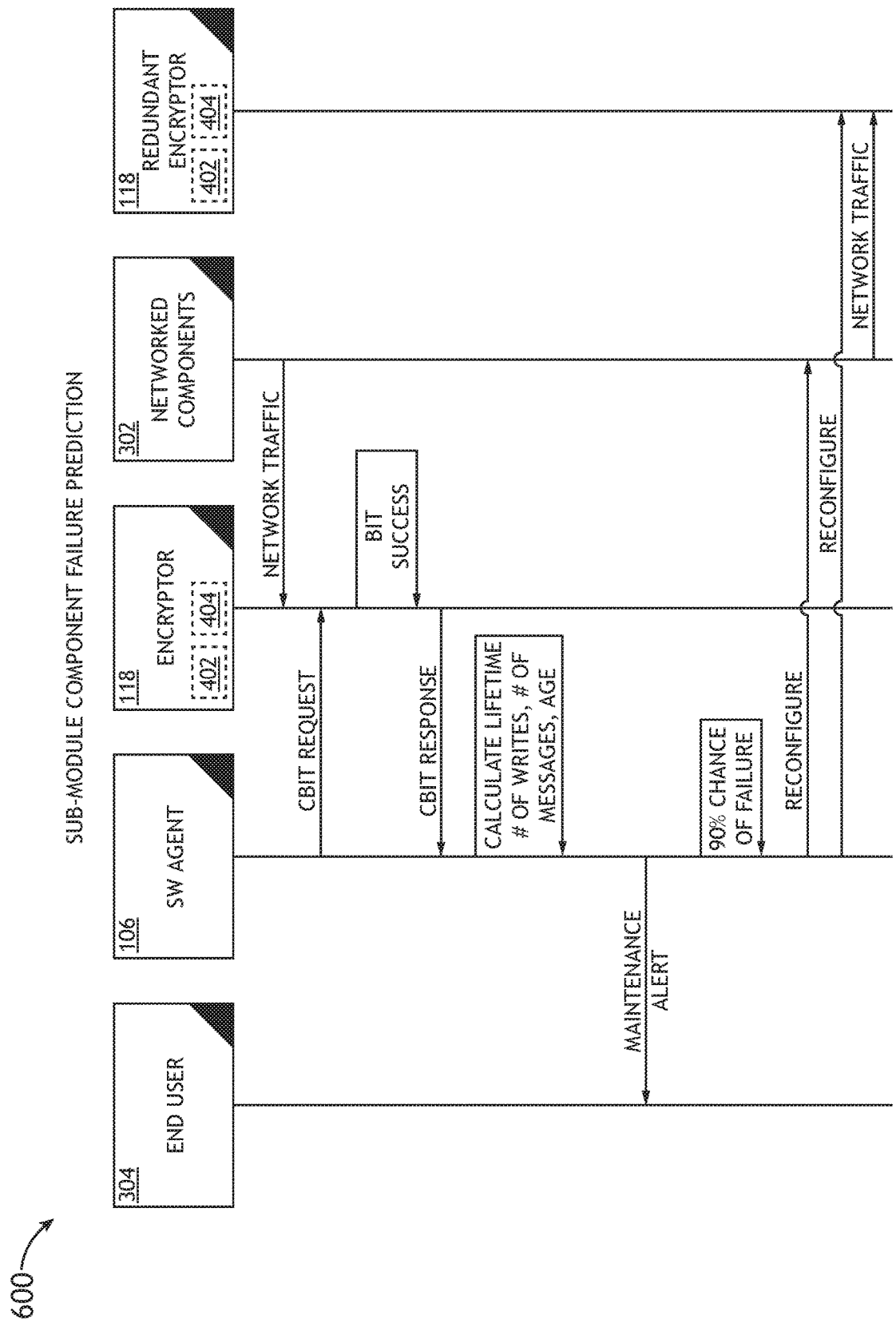
FIG. 6 is a flow diagram illustrating an example use of a method for operating a fault resilient airborne network, in accordance with one or more embodiments of the disclosure.

Referring now to FIG. 6, a flow diagram 600 of the fault resilient airborne network 100 addressing a failing network node or module is illustrated.

In the flow diagram 600, a faulty or failing sub-module of a network node or module is observed within the fault resilient airborne network 100. For example, the faulty or failing sub-module may include a memory sub-module 402 of an encryptor 118.

The memory sub-module 402 of the encryptor 118 may receive data (e.g., network traffic) from one or more networked components 302 (e.g., a routing device 110, a recording device 120, a maintenance device 122, as illustrated in the example configuration of the fault resilient airborne network 100 in FIG. 1).

An agent 106 may monitor the memory sub-module 402 of the encryptor 118. Based on a response (or lack of response) from the memory sub-module 402 of the encryptor 118, the agent 106 may predict whether the memory sub-module 402 of the encryptor 118 will become faulty or will fail. For example, the agent 106 may transmit a commanded built-in-test (CBIT) request to the memory sub-module 402 of the encryptor 118, and the memory sub-module 402 of the encryptor 118 may generate and transmit information to the agent 106 in response to the CBIT request.

After receiving the generated and transmitted information, the agent 106 may analyze the life expectancy of the memory sub-module 402 of the encryptor 118. For example, the life expectancy may be based on a number of write functions to NAND based on one or more parameters including, but not limited to, network data flow, power-on time, and age of the memory sub-module 402. By way of another example, the life expectancy may be based on the lifetime of other, previously-installed memory sub-modules 402.

The life expectancy may be set to a predicted window of time based on a threshold. For example, the threshold may be a percent likelihood of a fault developing or a failure occurring within a select number of uses. For instance, the threshold may be a 90 percent (%) likelihood of a fault developing or a failure occurring within a select number of uses.

Upon predicting the memory sub-module 402 of the encryptor 118 is likely to develop a fault or a failure, the agent 106 may transmit reconfiguration instructions to the one or more networked components 302 attempting to transmit data (e.g., network traffic) to the encryptor 118. In addition, upon predicting the memory sub-module 402 of the encryptor 118 is likely to develop a fault or a failure, the agent 106 may transmit reconfiguration instructions to the encryptor 118. For instance, based on the reconfiguration instructions the encryptor 118 may be configured to use a redundant memory sub-module 404 in place of the faulty or failing memory sub-module 402, and the redundant memory sub-module 404 may be configured to receive the transmitted data (e.g., network traffic) from the one or more networked components 302. Further, upon predicting the memory sub-module 402 of the encryptor 118 is likely to develop a fault or a failure the agent 106 may transmit reconfiguration instructions to a redundant encryptor 118. Based on the reconfiguration instructions, the one or more networked components 302 may be configured to transmit data (e.g., network traffic) to the redundant encryptor 118, and the redundant encryptor 118 may be configured to receive the transmitted data (e.g., network traffic) from the one or more networked components 302.

The agent 106 may then attempt to reconfigure (e.g., attempt to repair) the faulty or failing memory sub-module 402 of the encryptor 118, such that the repaired memory sub-module 402 of the encryptor 118 may be re-used immediately or re-used following another memory sub-module of the encryptor 118 developing a fault or failure. In addition or in the alternative, the agent 106 may transmit an alert to an end user (e.g., pilot, crew member, maintenance technician, operator, or the like) about the faulty or failing memory sub-module 402 of the encryptor 118, where the end user may have capabilities to schedule and/or complete maintenance action before the predicted fault or failure of the component occurs (e.g., (e.g., via provided instructions, without interfering with flight activities).

It is noted herein that multiple agents 106 may be configured to monitor the memory sub-module 402 of the encryptor 118. Here, a determination of whether the memory sub-module 402 of the encryptor 118 is faulty or failing may be decided between the multiple agents 106, and/or may be decided by a super agent 108 communicatively coupled to the multiple agents 106 and configured to arbitrate whether the memory sub-module 402 of the encryptor 118 is faulty or failing based on information provided by the multiple agents 106.

Although the example method of the flow diagram 600 is illustrated as addressing a faulty or failing memory sub-module 402 of the encryptor 118, it is noted herein the method may be extended to any component (e.g., module or sub-module) of the fault resilient airborne network 100. Therefore, the above description should not be interpreted as a limitation on the scope of the disclosure but merely an illustration.

As such, the examples uses of the method 200 provided in the flow diagrams 300, 400, 500, 600 illustrate the ability of the fault resilient airborne network 100 to monitor, predict, reconfigure, and/or repair hardware, firmware, and/or software of components within the fault resilient airborne network 100 down to memory or processing device sub-modules (e.g., through the rotation/retirement of memory sub-modules, replacement of memory or processing device sub-modules, or the like). In this regard, the fault resilient airborne network 100 may be self-healing.

FIG. 7 illustrates the aircraft 700 including the fault resilient airborne network 100, in accordance with one or more embodiments of the disclosure.

The aircraft 700 may include the fault resilient airborne network 100. Although multiple aircraft 700 may be manufactured from a predetermined build, it is possible that any particular aircraft has a particular hardware background and/or usage (e.g., as defined by physical characteristics caused during manufacturing). As such, the particular aircraft may have a unique implementation of the build.

To accommodate for the unique build implementation, the fault resilient airborne network 100 may implement machine learning models or algorithms based on what it learns from the corresponding onboard components of the aircraft 700 by monitoring them with the one or more agents 106 and/or the one or more super agents 108. The machine learning models or algorithms may include, but are not limited to, learning-based processes such as linear regression, neural networks, deep neural networks, or the like.

Figure 8A:
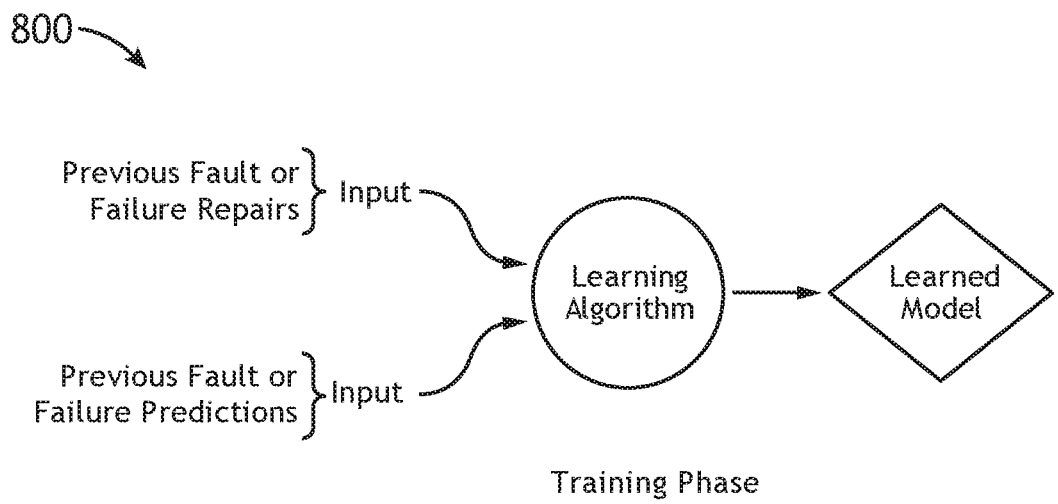
FIG. 8A illustrates a block diagram of a training phase for machine learning model of a fault resilient airborne network, in accordance with one or more embodiments of the disclosure.
Figure 8B:
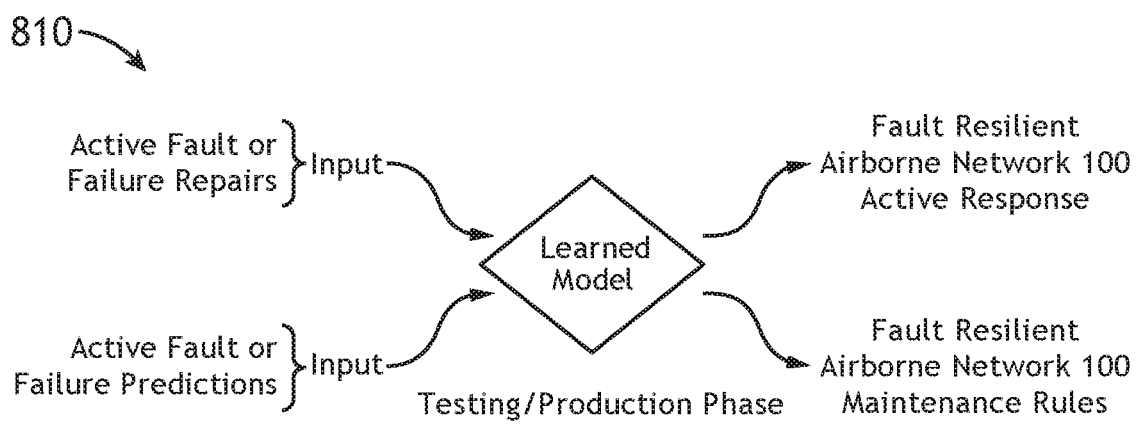
FIG. 8B illustrates a block diagram of a testing/production phase for machine learning model of a fault resilient airborne network, in accordance with one or more embodiments of the disclosure.

FIGS. 8A and 8B generally illustrate phases of machine-learning models or algorithms, in accordance with one or more embodiments of the present disclosure.

In a training phase 800, as illustrated in FIG. 8A, data from previous repairs and/or predictions is aggregated. The aggregated data may be input into a learning model or algorithm. The learning model or algorithm may generate a learned model or algorithm based on the input data.

In a testing/production phase 810, as illustrated in FIG. 8B, a set of data for an active scenario requiring a possible repair of a fault or failure or a possible prediction about whether a fault or failure will develop may be input into the learned model or algorithm. The learned model may generate an immediate response to the active scenario. In addition or in the alternative, the learned model may generate a set of rules or guidelines specific to the particular aircraft 700 on which the fault resilient airborne network 100 is installed, such that any heuristics models or algorithms for the aircraft 700 build may be improved on a case-by-case basis. It is noted herein that increased workflow time may result in more known results and more known responses to different issues within differently-operating nodes or modules. In this regard, the particular set of rules or guidelines may provide the particular aircraft 700 with better maintenance than a single set of defined rules for all aircraft 700 manufactured from a similar build. This may result in decreased downtime and cost for repair and reduced danger.

Referring again to FIG. 7, one or more controller devices 702 may be coupled (e.g., physically, electrically, and/or communicatively) to the fault resilient airborne network 100.

The one or more controller devices 702 may be housed within the aircraft 700. It is noted herein, however, that the one or more controller devices 702 may be offboard the aircraft 700 (e.g., in possession of an air traffic control tower, in possession of an offboard ground maintenance crew, in possession of a manufacturing line operator, in possession of a quality control tester, or the like).

For example, one or more components of the fault resilient airborne network 100 may be configured to transmit data to and/or receive data from the onboard one or more controller devices 702 and/or the offboard one or more controller devices 702. By way of another example, one or more components of the fault resilient airborne network 100 may be configured to record event logs and may transmit the event logs to the onboard one or more controller devices 702 and/or the offboard one or more controller devices 702. By way of another example, the one or more controller devices 702 may be configured to receive information and/or commands from the onboard one or more controller devices 702 and/or the offboard one or more controller devices 702, either in response to (or independent of) the transmitted event logs.

The one or more controller devices 702 may include at least one of one or more processing devices 704, memory 706 configured to store one or more sets of program instructions 708, and/or one or more communication interfaces 710.

The one or more processing devices 704 provides processing functionality for at least the one or more controller devices 702 and may include any number of processors, micro-controllers, circuitry, field programmable gate array (FPGA) or other processing systems, and resident or external memory for storing data, executable code, and other information accessed or generated by the one or more controller devices 702. The one or more processing devices 704 may execute one or more software programs (e.g., the one or more sets of program instructions 708) embodied in a non-transitory computer readable medium (e.g., the memory 706) that implement techniques described herein. The one or more processing devices 704 are not limited by the materials from which it is formed or the processing mechanisms employed therein and, as such, may be implemented via semiconductor(s) and/or transistors (e.g., using electronic integrated circuit (IC) components), and so forth.

The memory 706 may be an example of tangible, computer-readable storage medium that provides storage functionality to store various data and/or program code associated with operation of the one or more controller devices 702 and/or one or more processing devices 704, such as software programs and/or code segments, or other data to instruct the one or more processing devices 704 and/or other components of the one or more controller devices 702, to perform the functionality described herein. Thus, the memory 706 may store data, such as a program of instructions for operating the one or more controller devices 702, including its components (e.g., one or more processing devices 704, the one or more communication interfaces 710, or the like), and so forth. It should be noted that while a single memory 706 is described, a wide variety of types and combinations of memory (e.g., tangible, non-transitory memory) may be employed. The memory 706 may be integral with the one or more processing devices 704, may include stand-alone memory, or may be a combination of both. Some examples of the memory 706 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controller devices 702 may be configured to perform one or more process steps, as defined by the one or more sets of program instructions 708. The one or more process steps may be performed iteratively, concurrently, and/or sequentially. The one or more sets of program instructions 708 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 708 may be configured to operate via proportional control, feedback control, feedforward control, integral control, proportional-derivative (PD) control, proportional-integral (PI) control, proportional-integral-derivative (PID) control, or the like.

The one or more communication interfaces 710 may be operatively configured to communicate with components of the one or more controller devices 702. For example, the one or more communication interfaces 710 may be configured to retrieve data from the one or more processing devices 704 or other devices, transmit data for storage in the memory 706, retrieve data from storage in the memory 706, and so forth. The one or more communication interfaces 710 may also be coupled (e.g., physically, electrically, and/or communicatively) with the one or more processing devices 704 to facilitate data transfer between components of the one or more controller devices 702 and the one or more processing devices 704. It should be noted that while the one or more communication interfaces 710 is described as a component of the one or more controller devices 702, one or more components of the one or more communication interfaces 710 may be implemented as external components coupled (e.g., physically, electrically, and/or communicatively) to the one or more controller devices 702 via a wired and/or wireless connection. The one or more controller devices 702 may also include and/or connect to one or more input/output (I/O) devices. In some embodiments, the one or more communication interfaces 710 includes or is coupled (e.g., physically, electrically, and/or communicatively) to a transmitter, receiver, transceiver, physical connection interface, or any combination thereof.

The one or more controller devices 702 may be coupled (e.g., physically, electrically, and/or communicatively) to one or more user interface devices 712. The one or more user interface devices 712 may include and/or be configured to interact with one or more display devices 714. The one or more user interface devices 712 may include and/or be configured to interact with one or more user input devices 716.

The one or more communication interfaces 710 may be operatively configured to communicate with one or more user interface devices 712. The one or more controller devices 702 and the one or more user interface devices 712 may be separate components (e.g., have separate housings and/or separate chassis). It is noted herein, however, that the one or more controller devices 702 and the one or more user interface devices 712 may be components integrated in a single housing and/or on a single chassis.

The one or more display devices 714 may include any display device known in the art. For example, the one or more display devices 714 may include, but are not limited to, a liquid crystal display (LCD), a light-emitting diode (LED) display, an organic light-emitting diode (OLED) based display, or the like. Those skilled in the art should recognize that a variety of display devices 714 may be suitable for implementation in the disclosure and the particular choice of display device may depend on a variety of factors, including, but not limited to, form factor, cost, and the like. In a general sense, any display device capable of integration with the one or more user input devices 716 (e.g., touchscreen, bezel mounted interface, keyboard, mouse, trackpad, and the like) is suitable for implementation in the disclosure.

The one or more user input devices 716 may include any data input device known in the art. For example, the one or more user input devices 716 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

It is noted herein the aircraft 700, the one or more controller devices 702, and/or the one or more user interface devices 712 (and/or select components of the aircraft 700, the one or more controller devices 702, and/or the one or more user interface devices 712) may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standard setting organization or company; the Radio Technical Commission for Aeronautics (RTCA) or any other guidelines agency or organization; or the like.

Although embodiments of the disclosure are directed to the fault resilient airborne network 100 as being operable with the aircraft 700, it is noted herein the fault resilient airborne network 100 may instead be a fault resilient network that is installed in and/or configured or dimensioned to fit within any type of vehicle known in the art. For example, the vehicle may be any air, land, or water-based personal equipment or vehicle; any air, land, or water-based commercial equipment or vehicle; any air, land, or water-based military equipment or vehicle known in the art. For instance, the vehicle may be a passenger aircraft.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A fault resilient airborne network, comprising:
   a plurality of aircraft system components installed within an aircraft; and
   at least one agent in communication with the plurality of aircraft system components during in-flight operation of the aircraft, the at least one agent configured to:
      monitor an aircraft system component of the plurality of aircraft system components for a fault;
      observe a fault within the aircraft system component;
      provide reconfiguration instructions to the aircraft system component in response to the observed fault of the aircraft system component, the reconfiguration instructions provided in response to the observed fault being configured to cause an adjustment in at least some of the plurality of aircraft system components installed within the aircraft;
      predict a life expectancy of the aircraft system component using machine learning models while monitoring the aircraft system component for the fault, the machine learning models being configured to predict the life expectancy of the aircraft system component based on a set of rules generated from a plurality of faults previously-observed within the plurality of aircraft system components; and
      provide reconfiguration instructions to the aircraft system component when the life expectancy of the aircraft system component meets a threshold, the threshold being defined by a percentage chance the aircraft system component will develop the fault, the reconfiguration instructions provided in response to the meeting of the threshold being configured to cause an adjustment in at least some of the plurality of aircraft system components installed within the aircraft.

2. The fault resilient airborne network of claim 1, the at least one agent being a subset of a plurality of agents, the plurality of agents each being configured to monitor the aircraft system component for a fault.

3. The fault resilient airborne network of claim 1, the aircraft system component being configured to receive data from a second aircraft system component of the plurality of aircraft system components.

4. The fault resilient airborne network of claim 1, the at least one agent further configured to:
   repair the observed fault within the aircraft system component.

5. The fault resilient airborne network of claim 2, further comprising:
   at least one super agent in communication with the plurality of agents during the in-flight operation of the aircraft, the at least one super agent configured to:
      receive data from the plurality of agents, the data collected by the plurality of agents while monitoring the aircraft system component; and
      arbitrate whether a fault was observed within the aircraft system component based on the data.

6. The fault resilient airborne network of claim 3, the at least one agent further configured to:
   provide reconfiguration instructions to a third aircraft system component of the plurality of aircraft system components, the third aircraft system component being redundant to the aircraft system component with the observed fault, the reconfiguration instructions provided to the third aircraft system component being to receive data from the second aircraft system component in place of the aircraft system component with the observed fault.

7. The fault resilient airborne network of claim 3, the fault being observed within a sub-module of the aircraft system component.

8. The fault resilient airborne network of claim 6, the at least one agent further configured to:
provide reconfiguration instructions to the second aircraft system component, the reconfiguration instructions provided to the second aircraft system component being to transmit data to the third aircraft system component instead of to the aircraft system component with the observed fault.

9. The fault resilient airborne network of claim 7, the at least one agent further configured to:
provide reconfiguration instructions to a second sub-module of the aircraft system component with the observed fault in the sub-module, the reconfiguration instructions provided to the second sub-module being to receive data from the second aircraft system component in place of the sub-module with the observed fault.

10. The fault resilient airborne network of claim 9, the at least one agent further configured to:
provide reconfiguration instructions to the second aircraft system component, the reconfiguration instructions provided to the second aircraft system component being to transmit data to the second sub-module of the aircraft system component with the observed fault in the sub-module instead of to the sub-module with the observed fault.

* * * * *